US010967831B2

(12) United States Patent
Fujinami et al.

(10) Patent No.: US 10,967,831 B2
(45) Date of Patent: Apr. 6, 2021

(54) SEATBELT CONTROL DEVICE

(71) Applicant: TOYOTA JIDOSHA KABUSHIKI KAISHA, Toyota (JP)

(72) Inventors: Takashi Fujinami, Nagoya (JP); Yusuke Mase, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 16/257,449

(22) Filed: Jan. 25, 2019

(65) Prior Publication Data
US 2019/0291689 A1  Sep. 26, 2019

(30) Foreign Application Priority Data
Mar. 23, 2018  (JP) .............................. JP2018-056229

(51) Int. Cl.
| | | |
|---|---|---|
| *B60R 22/46* | (2006.01) | |
| *B60R 21/015* | (2006.01) | |
| *B60R 21/0132* | (2006.01) | |
| *B60R 21/01* | (2006.01) | |

(52) U.S. Cl.
CPC ...... *B60R 22/4676* (2013.01); *B60R 21/0132* (2013.01); *B60R 21/01558* (2014.10); *B60R 2021/01272* (2013.01); *B60R 2021/01279* (2013.01); *B60R 2021/01322* (2013.01); *B60R 2022/4685* (2013.01)

(58) Field of Classification Search
CPC ...... B60R 22/4676; B60R 2021/01322; B60R 21/01558; B60R 21/0132; B60R 2021/01272; B60R 2021/01279; B60R 2022/4685; B60R 22/44; B60R 22/46; B60R 22/48
See application file for complete search history.

(56) References Cited

U.S. PATENT DOCUMENTS

| | | |
|---|---|---|
| 2007/0001047 A1 | 1/2007 | Yasuda et al. |
| 2008/0099594 A1 | 5/2008 | Hiramatsu |
| 2011/0035117 A1* | 2/2011 | Yamada ............... B60R 22/4676 701/45 |

FOREIGN PATENT DOCUMENTS

| | | |
|---|---|---|
| JP | 2001-260811 A | 9/2001 |
| JP | 2007-084042 A | 4/2007 |
| JP | 2008-114659 A | 5/2008 |
| JP | 2009-190594 A | 8/2009 |

(Continued)

*Primary Examiner* — Brian P Sweeney
(74) *Attorney, Agent, or Firm* — Oliff PLC

(57) ABSTRACT

A seatbelt retractor device includes a pre-tensioner section, and a force limiter section that can change a magnitude of a load at which to start reducing tension of the retracted seatbelt. A seatbelt control ECU activates the pre-tensioner section when a deceleration G detected by a floor sensor exceeds a first threshold, and acquires a collision velocity from a radar device and sets a second threshold value to a lower value the greater the collision velocity. The seatbelt control ECU controls the starting load for tension reduction by the force limiter section to be a high load when the deceleration G has exceeded the second threshold within a determination time period after activation of the pre-tensioner section, and controls the starting load for tension reduction to be a low load when which the deceleration G has not exceeded the second threshold within the determination time period.

8 Claims, 14 Drawing Sheets

(56) References Cited

FOREIGN PATENT DOCUMENTS

| JP | 2012-111489 A | 6/2012 | | |
|---|---|---|---|---|
| WO | WO 2003059707 A1 | * | 7/2003 | ............. B60R 22/46 |

* cited by examiner

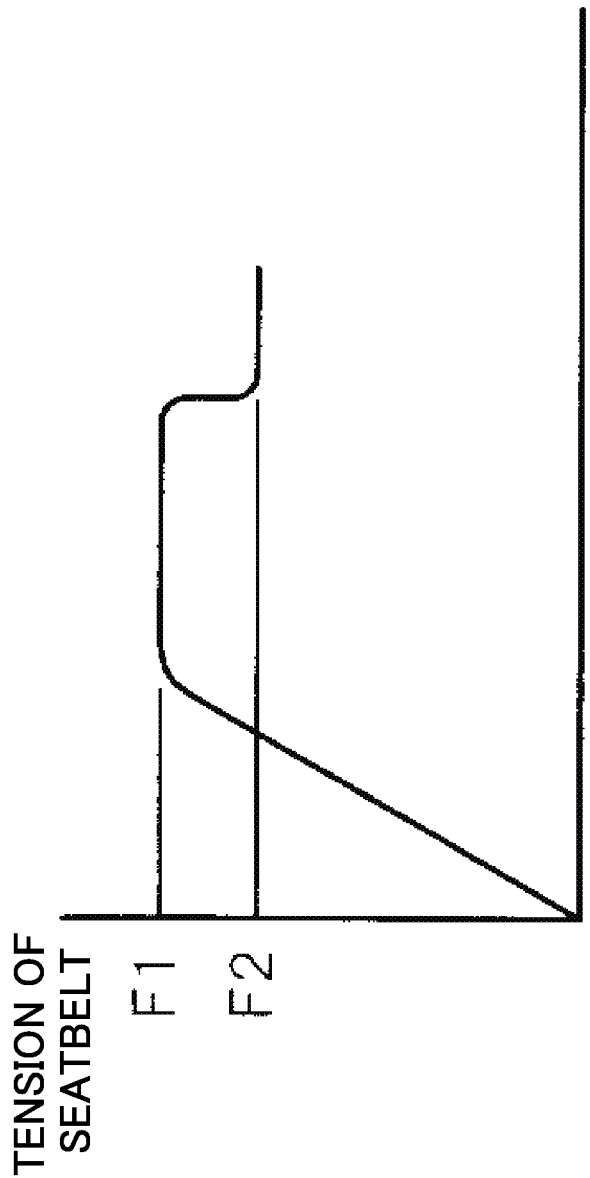

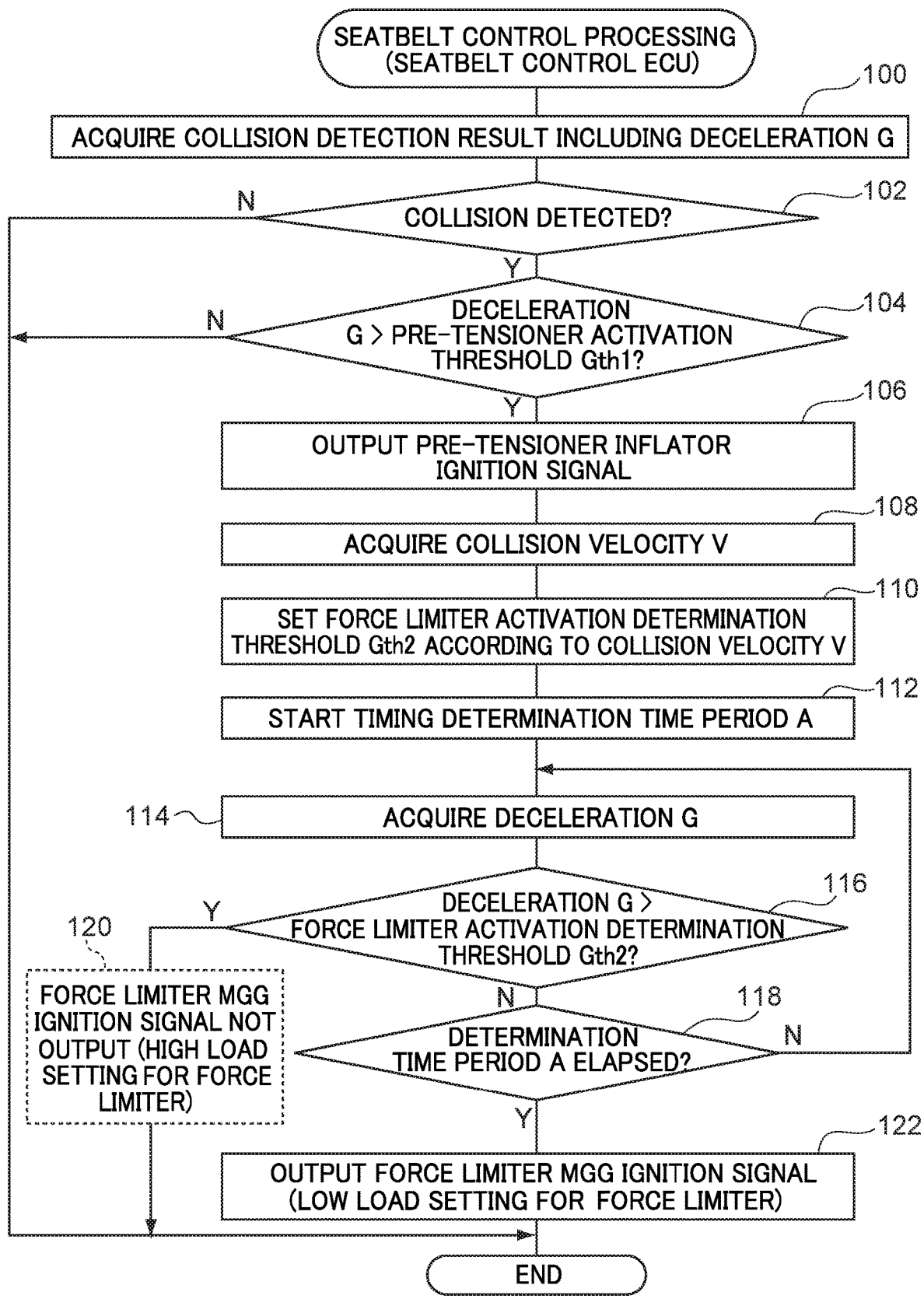

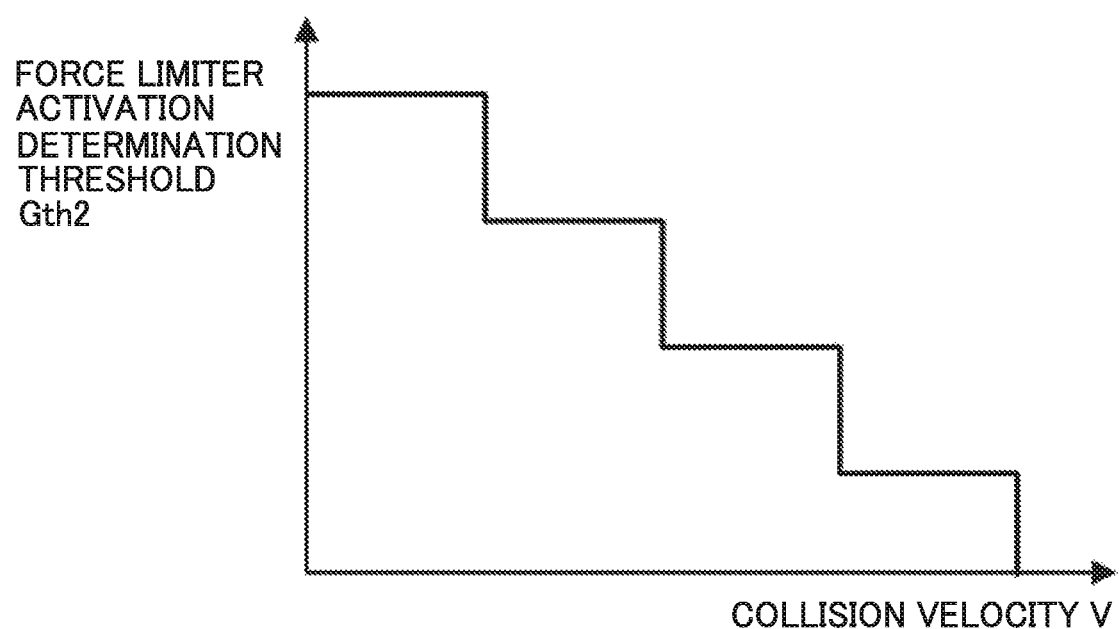

SEATBELT CONTROL DEVICE

CROSS-REFERENCE TO RELATED APPLICATION

This application claims priority under 35 USC 119 from Japanese Patent Application No. 2018-056229, filed on Mar. 23, 2018, the disclosure of which is incorporated by reference herein.

BACKGROUND

Technical Field

The present disclosure relates to a seatbelt control device.

Related Art

Japanese Patent Application Laid-Open (JP-A) No. 2009-190594 proposes a technology in which a load setting of a force limiter mechanism is switched according to whether or not deceleration of a vehicle exceeds a second threshold within a time period A for identifying a collision, the time period A running from the start of activation of a pre-tensioner mechanism when the vehicle deceleration has exceeded a first threshold. In this technology, the force limiter mechanism is set to a high load, in a case in which the vehicle deceleration exceeds the second threshold within the time period A, and the force limiter mechanism is set to a low load after the time period A has elapsed, in a case in which the vehicle deceleration does not exceed the second threshold within the time period A.

A change in deceleration over time when a vehicle collides with an object varies according to the hardness of the colliding object, the manner of collision, and so on. For example, in a case in which a colliding object has a soft leading end followed by a hard portion, as illustrated in FIG. 13 as an example, a change is exhibited in which the soft leading end deforms during an initial stage of the collision, resulting in a small amount of deceleration, after which the hard portion subsequently strikes the vehicle and deceleration increases. An example of an object with a soft leading end followed by a hard portion is a front section of a vehicle, which has a soft bumper at a front end, and a hard engine disposed behind the bumper. A front-end collision between vehicles is a typical example of a collision that would exhibit a change in deceleration over time such as that illustrated in FIG. 13.

However, collisions exhibiting a change in deceleration over time such as that illustrated in FIG. 13 are not limited to cases in which the vehicle collides with an object with a soft leading end and followed by a hard portion. For example, in a case in which a hard, narrow object such as a utility pole collides near to a vehicle width direction central portion of a front section of a vehicle, a change is exhibited in which the vehicle bumper deforms in the initial stage of the collision, resulting in a small amount of deceleration, following which the colliding object strikes the engine and deceleration increases. In a case in which a change in deceleration over time such as that illustrated in FIG. 13 is exhibited during a collision, the overall collision energy of the collision is relatively high (an integral value of the change in deceleration is relatively large), and so it would be appropriate to set the force limiter mechanism to a high load.

However, in the technology disclosed in JP-A No. 2009-190594, in a case in which deceleration changes as illustrated in FIG. 13 during a collision, the deceleration would not exceed the second threshold within the time period A, and so the force limiter mechanism would be set to a low load. Setting the force limiter mechanism to a low load is generally realized by igniting a Micro Gas Generator (MGG). Accordingly, once the force limiter mechanism has been set to a low load it cannot then be switched to a high load, even if deceleration increases after the time period A has elapsed. Accordingly, there is room for improvement in the technology disclosed in JP-A No. 2009-190594 with respect to controlling the load of the force limiter mechanism.

SUMMARY

The present disclosure provides a seatbelt control device that may appropriately control the load of a force limiter section, in a case in which a collision with a low impact intensity in an initial stage of the collision has occurred.

A first aspect of the present disclosure is a seatbelt control device including: a pre-tensioner section configured to retract a seatbelt to increase tension of the seatbelt; a force limiter section configured to change a magnitude of a load at which to start reducing tension of the seatbelt retracted by the pre-tensioner section; and a controller configured to activate the pre-tensioner section in a case in which a physical quantity relating to a magnitude of a collision detected by a first detection section for detecting the physical quantity exceeds a first threshold, or in a case in which a collision has been predicted by a collision prediction section, the controller controlling the load of the force limiter section in a case in which, within a predetermined period after activation of the pre-tensioner section, the physical quantity detected by the first detection section has exceeded a second threshold set according to a collision velocity detected by a second detection section, so as to be a greater load than the load of the force limiter section in a case in which the physical quantity has not exceeded the second threshold within the predetermined period.

In the first aspect of the present disclosure, the pre-tensioner section is activated in a case in which the physical quantity relating to the magnitude of a collision exceeds the first threshold, or in a case in which a collision has been predicted. In a case in which the physical quantity has exceeded the second threshold within the predetermined period after the pre-tensioner section has been activated, the load at which the force limiter section starts reducing tension of the seatbelt retracted by the pre-tensioner section is controlled so as to be a greater load than in a case in which the physical quantity has not exceeded the second threshold within the predetermined period. Note that in a case in which a collision has low impact intensity during an initial collision stage, the overall collision energy of the collision, more specifically the transition of change in the physical quantity after the predetermined period has elapsed, is correlated with the collision velocity. Accordingly, in the first exemplary embodiment of the present disclosure, the second threshold is set according to the collision velocity detected by the second detection section.

Accordingly, when a low value has been set as the second threshold according to the collision velocity, this being correlated with the overall collision energy of the collision, the physical quantity can easily exceed the second threshold value within the predetermined period, even in a collision with low impact intensity during the initial collision stage. In a case in which the physical quantity has exceeded the second threshold within the predetermined period, the load of the force limiter section is controlled so as to be a large load. On the other hand, when a large value has been set as the second threshold according to the collision velocity (this being correlated with the overall collision energy of the collision) in a collision with low impact intensity during the initial collision stage, the physical quantity cannot exceed the second threshold value so easily within the predetermined period. In a case in which the physical quantity has not exceeded the second threshold within the predetermined period, the load of the force limiter section is controlled so as to be a small load. Accordingly, the first aspect of the present disclosure may appropriately control the load of the force limiter section in collisions with low impact intensity during the initial collision stage.

In a second aspect of the present disclosure, in the first aspect, the controller may set the second threshold applied in a case in which the collision velocity has exceeded a predetermined value, to a value no greater than the second threshold applied in a case in which the collision velocity has not exceeded the predetermined value.

Regarding the correlation between collision velocity and the overall collision energy of a collision, the overall collision energy of the collision tends to increase as the collision velocity increases. On this basis, in the second aspect of the present disclosure, the second threshold applied in a case in which the collision velocity has exceeded the predetermined value is set to a value no greater than the second threshold applied in a case in which the collision velocity has not exceeded the predetermined value. Accordingly, in a case in which the collision velocity has exceeded the predetermined value, and the collision is anticipated to have a large collision energy overall, the physical quantity can exceed the second threshold more easily within the predetermined period due to setting the second threshold to a lower value. Accordingly, the second aspect of the present disclosure may even more appropriately control the load of the force limiter section in collisions with low impact intensity during the initial collision stage.

In a third aspect of the present disclosure, in the first aspect or the second aspect, the second detection section may be at least one of a radar or a camera.

In a fourth aspect of the present disclosure, in the above aspects, the first detection section may detect deceleration as the physical quantity; and the controller, may sets as the second threshold, a threshold for an integral value of the deceleration detected by the first detection section according to the collision velocity, and determines whether or not the integral value of the deceleration has exceeded the set second threshold within a predetermined period after the pre-tensioner section has been activated.

In the above aspects, a seatbelt control device of the present disclosure may appropriately control the load of the force limiter section in a case in which a collision with a low impact intensity in an initial stage of the collision has occurred.

BRIEF DESCRIPTION OF THE DRAWINGS

Exemplary embodiments will be described in detail based on the following figures, wherein:

FIG. 4 is a diagram illustrating a difference in seatbelt tension depending on whether or not a force limiter MGG has been ignited;

FIG. 5 is a flowchart illustrating seatbelt control processing according to a first exemplary embodiment;

FIG. 6C is a graph illustrating a second alternative example of a threshold setting map;

DETAILED DESCRIPTION

Detailed explanation follows regarding examples of exemplary embodiments of the present disclosure, with reference to the drawings.

First Exemplary Embodiment

Figure 1:
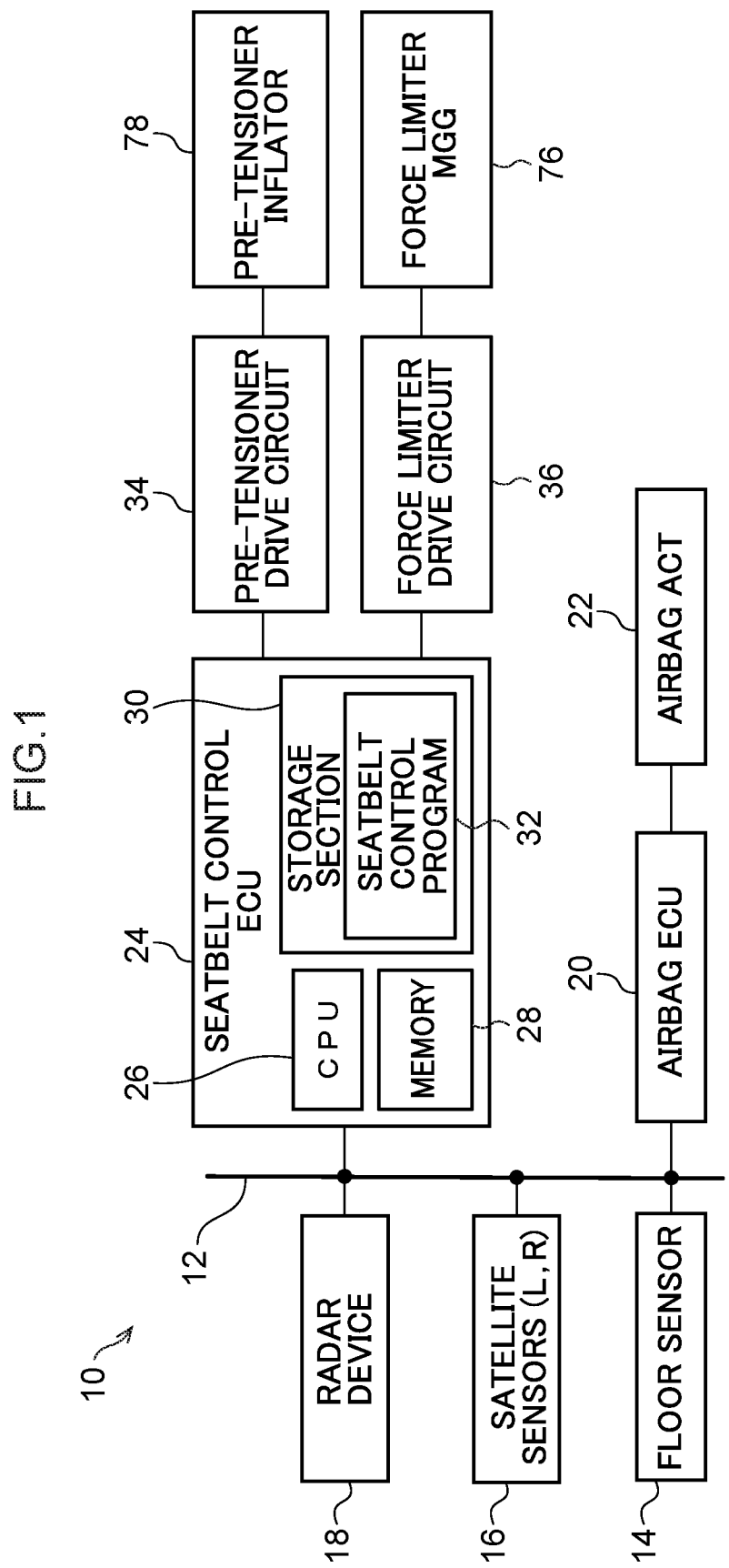
FIG. 1 is a schematic block diagram of an onboard system according to an exemplary embodiment.

As illustrated in FIG. 1, an onboard system 10 includes a bus 12. Plural sensor units and plural electronic control units that perform different control to each other are respectively connected to the bus 12. Note that FIG. 1 only illustrates part of the onboard system 10. Each individual Electronic Control Unit (hereafter referred to as ECU) is a control unit including a CPU, memory, and a non-volatile storage section. The plural sensor units connected to the bus 12 include a floor sensor 14, satellite sensors 16, and a radar device 18. The plural ECUs connected to the bus 12 include an airbag ECU 20 and a seatbelt control ECU 24.

Figure 2:
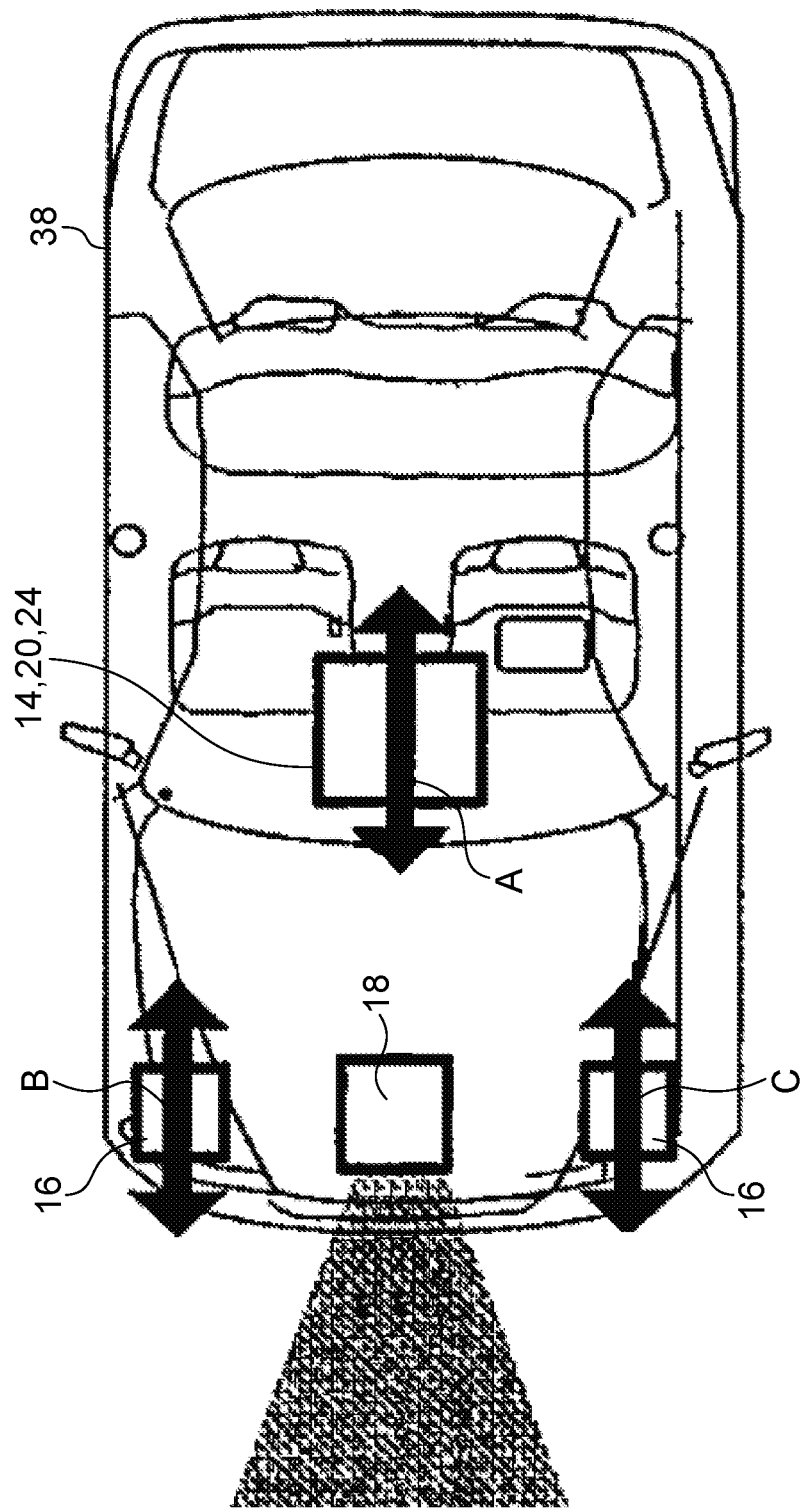
FIG. 2 is a plan view of a vehicle.

As illustrated in FIG. 2, the floor sensor 14 is disposed inside a vehicle cabin of a vehicle 38 together with the airbag ECU 20 and the seatbelt control ECU 24. The floor sensor 14 detects front-rear direction acceleration (deceleration G) of the vehicle 38 inside the vehicle cabin of the vehicle 38, as illustrated by the arrow A in FIG. 2. As illustrated in FIG. 2, the satellite sensors 16 are respectively disposed on the left and right of the vehicle 38, close to a front end section. The satellite sensors 16 detect front-rear direction acceleration (deceleration Gs) on the left and right of the vehicle 38 close to the front end section of the vehicle 38, as illustrated by the arrows B, C in FIG. 2.

The radar device 18 includes plural radar devices having different detection ranges to each other. The radar device 18 detects objects such as pedestrians and other vehicles present within a detection range in front of the vehicle 38 (illustrated by hatching in FIG. 2) as point information, and acquires the position and speed of detected objects relative to the vehicle 38. A processor that processes detection results for objects in the vicinity is inbuilt in the radar device 18. Based on changes in the relative position, relative speed, and so on of each object included in plural recent detection results, the processor eliminates noise, roadside objects such as guard rails, and the like from monitoring targets, and tracks designated objects, such as pedestrians and other vehicles, as monitoring targets. The radar device 18 outputs information such as the relative position and relative speed of each monitoring target object.

The airbag actuator 22 configures an airbag device together with the airbag ECU 20 and is connected to the airbag ECU 20. Note that "actuator" is hereafter abbreviated to "ACT". In a case in which the deceleration G detected by the floor sensor 14 exceeds a threshold, the airbag ECU 20 deploys an airbag using the airbag ACT (inflator) 22.

The seatbelt control ECU 24 includes a CPU 26, memory 28, and a non-volatile storage section 30. A seatbelt control program 32 is stored in the storage section 30. The seatbelt control ECU 24 performs seatbelt control processing, described later, by reading the seatbelt control program 32 from the storage section 30 and expanding the seatbelt control program 32 in the memory 28, and executing the seatbelt control program 32 expanded in the memory 28 using the CPU 26.

A pre-tensioner inflator 78 is connected to the seatbelt control ECU 24 via a pre-tensioner drive circuit 34. A force limiter Micro Gas Generator (MGG) 76 is also connected to the seatbelt control ECU 24 via a force limiter drive circuit 36. The seatbelt control ECU 24 controls ignition of the pre-tensioner inflator 78 through the pre-tensioner drive circuit 34 based on information input from the floor sensor 14 and the satellite sensors 16. The seatbelt control ECU 24 also controls ignition of the force limiter MGG 76 through the force limiter drive circuit 36 based on information input from the floor sensor 14 and the radar device 18.

Note that in the first exemplary embodiment, the floor sensor 14 is an example of a first detection section, the radar device 18 is an example of a second detection section, and the seatbelt control ECU 24, the pre-tensioner drive circuit 34, and the force limiter drive circuit 36 configure an example of a controller.

Figure 3:
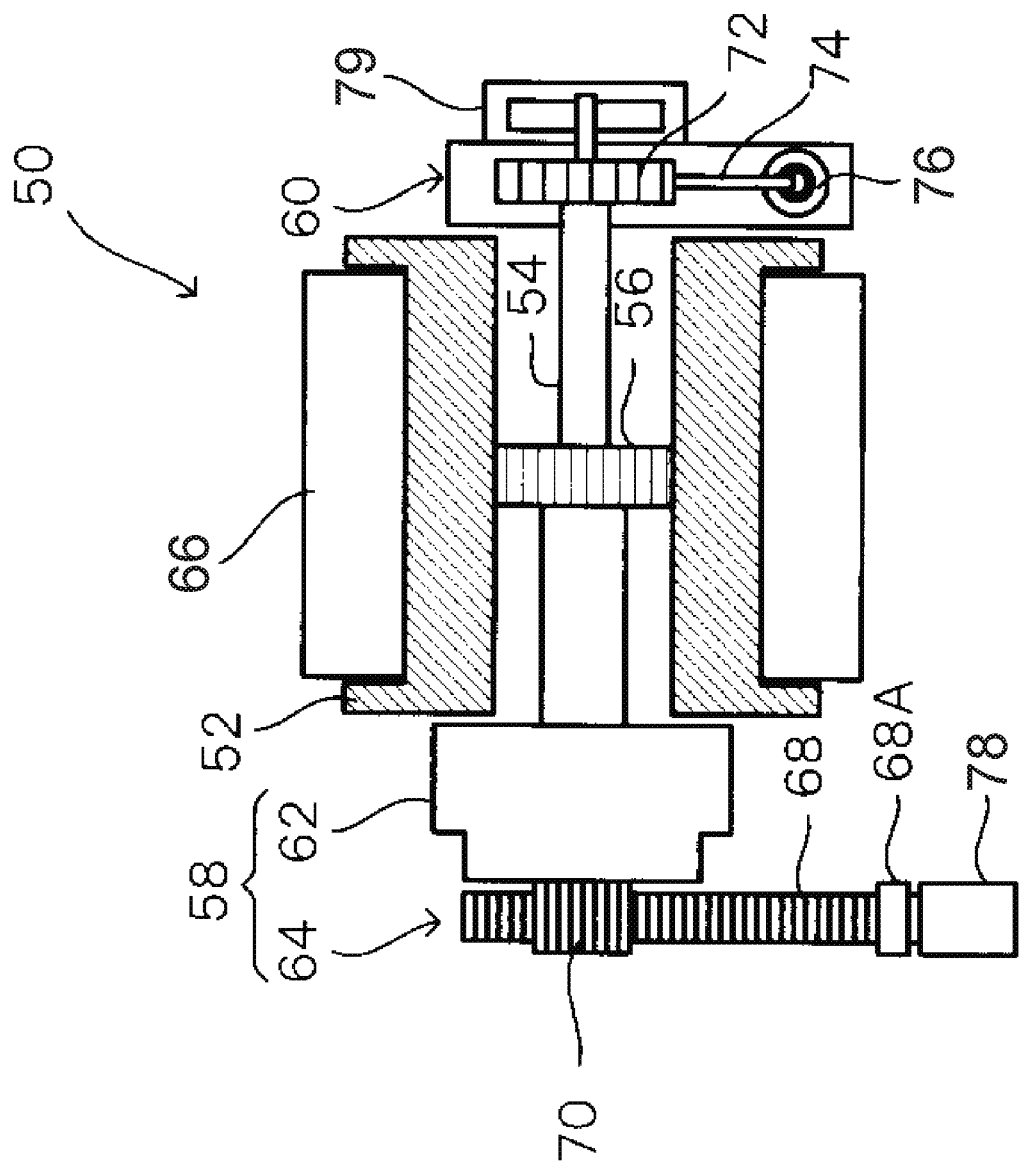
FIG. 3 is a schematic configuration diagram of a seatbelt retractor device.

As illustrated in FIG. 3, a seatbelt retractor device 50 includes a spool 52 that retracts a seatbelt 66. A central portion of the spool 52 is hollow, and a torsion bar 54 is provided in the hollow portion. The torsion bar 54 is coupled to the spool 52 through a coupling member 56 disposed close to an axial direction center portion of the spool 52, and functions as a rotation shaft of the spool 52. The diameter of the torsion bar 54 is different on either side of the coupling member 56. In the present exemplary embodiment, the torsion bar 54 has a larger diameter on the side of a pre-tensioner section 58 than on the side of a force limiter section 60, described later. Note that the force limiter section 60 side and the pre-tensioner section 58 side of the torsion bar 54 may be configured by a single unit, or the torsion bar 54 may have a structure in which the force limiter section 60 side and the pre-tensioner section 58 side of the torsion bar 54 are configured separately and coupled together by the coupling member 56.

The pre-tensioner section 58 is provided at one end of the torsion bar 54, and the force limiter section 60 is provided at the other end of the torsion bar 54. The pre-tensioner section 58 includes a belt lock mechanism 62 and a pre-tensioner mechanism 64. The belt lock mechanism 62 locks rotation of the spool 52 when a predetermined load is applied. Various known configurations may be applied as the belt lock mechanism 62, and so detailed explanation thereof is omitted.

The pre-tensioner mechanism 64 includes the pre-tensioner inflator 78, a piston rack 68, and a pinion gear 70. When the pre-tensioner inflator 78 is ignited and gas is generated in the pre-tensioner section 58, a piston 68A of the piston rack 68 is pushed outward, and the spool 52 is rotated by a rack gear of the piston rack 68 and the pinion gear 70, thereby taking up the seatbelt 66 by a predetermined amount.

The force limiter section 60 reduces tension of the seatbelt 66. When tension exceeding a predetermined load is applied to the seatbelt 66 while the belt lock mechanism 62 is in a locked state, the torsion bar 54 is twisted such that the spool 52 coupled to the torsion bar 54 through the coupling member 56 rotates and the seatbelt 66 is pulled out.

Specifically, the force limiter section 60 includes a gear 72 that engages with the torsion bar 54, a cam 74, and the force limiter MGG 76. The gear 72 is provided with a lock member that meshes with the cam 74 and restricts rotation of the gear 72 when tension exceeding a predetermined load is applied to the seatbelt 66. When the force limiter MGG 76 is ignited, the cam 74 is moved by gas pressure, such that the gear 72 does not mesh with the cam 74 and the locked state is prevented, even when tension exceeding the predetermined load is applied to the seatbelt 66.

A spring mechanism 79 that urges the spool 52 in a retracted direction of the seatbelt 66 is provided at the outer side of the force limiter section 60. The seatbelt 66 is retracted on the spool 52 by the urging force of the spring mechanism 79.

In the present exemplary embodiment, the seatbelt 66 is retracted when the pre-tensioner mechanism 64 of the pre-tensioner section 58 is activated. The belt lock mechanism 62 locks when an occupant moving under inertia pulls on the seatbelt 66, following which activation of the force limiter section 60 begins.

When the force limiter MGG 76 has not been ignited, the cam 74 and the gear 72 are locked together by the lock member of the force limiter section 60. When tension exceeding the predetermined load is applied to the seatbelt 66 while the cam 74 and the gear 72 are in the engaged state, the entire torsion bar 54 is twisted. The spool 52 coupled to the torsion bar 54 through the coupling member 56 rotates accompanying this twisting such that the seatbelt 66 is pulled out. Tension of the seatbelt 66 is thereby reduced while energy is absorbed.

When the force limiter MGG 76 is ignited, the meshing between the cam 74 and the gear 72 of the force limiter section 60 is released, such that the torsion bar 54 is only twisted on the pre-tensioner section 58 side of the coupling member 56. The spool 52 coupled to the torsion bar 54 through the coupling member 56 rotates accompanying this twisting such that the seatbelt 66 is pulled out. Tension of the seatbelt 66 is thus maintained at a lower level than in a case in which the force limiter MGG 76 has not been ignited.

Namely, when the force limiter MGG 76 has not been ignited, tension of the seatbelt 66 is maintained at the tension F1 illustrated in FIG. 4, and when the force limiter MGG 76 has been ignited, the tension applied to the seatbelt 66 is maintained at the tension F2 (<F1) illustrated in FIG. 4.

Next, explanation follows regarding operation of the first exemplary embodiment, with reference to FIG. 5. Seatbelt control processing is repeatedly executed by the seatbelt control ECU 24 while an ignition switch of the vehicle 38 is ON. At step 100 of the seatbelt control processing, the seatbelt control ECU 24 acquires a collision detection result including the deceleration G detected by the floor sensor 14 and the deceleration Gs detected by the satellite sensors 16.

At step 102, the seatbelt control ECU 24 determines whether or not a collision between the vehicle 38 and an object has been detected, based on the collision detection result acquired at step 100. As an example of the determination made at step 102, the seatbelt control ECU 24 may determine whether or not at least one out of the deceleration G or the deceleration Gs has exceeded a predetermined value (for example a value lower than a threshold Gth1, described later), and may determine that a collision has been detected in a case in which this determination is affirmative. However, there is no limitation thereto, and various known technology may be applied for this determination. For example, a pressure sensor may be provided to a bumper of the vehicle 38, and whether or not pressure has been applied to the bumper may be a consideration in the collision detection determination. In a case in which a negative determination is made at step 102, the seatbelt control processing is ended.

In a case in which an affirmative determination is made at step 102, processing proceeds to step 104. At step 104, the seatbelt control ECU 24 determines whether or not the deceleration G acquired at step 100 exceeds the preset pre-tensioner activation threshold Gth1. In a case in which a negative determination is made at step 104, the present collision can be determined to be a light collision that does not require activation of the pre-tensioner section 58, and so the seatbelt control processing is ended. Note that the pre-tensioner activation threshold Gth1 is an example of a first threshold.

In a case in which an affirmative determination is made at step 104, the present collision can be determined to be a collision requiring activation of the pre-tensioner section 58, and so processing proceeds to step 106. At step 106, the seatbelt control ECU 24 outputs a pre-tensioner inflator ignition signal to the pre-tensioner drive circuit 34. The pre-tensioner drive circuit 34 thereby ignites the pre-tensioner inflator 78, accompanying which the spool 52 is rotated by the pre-tensioner section 58 and the seatbelt 66 is retracted, such that the occupant is restrained.

Next, at step 108, the seatbelt control ECU 24 acquires the relative speed (collision velocity V) of the object that has collided with the vehicle 38 from the radar device 18. Note that, in a case in which plural objects are present in the vicinity of the vehicle 38, for example, the seatbelt control ECU 24 may acquire the relative speed of the object that is the shortest distance from the vehicle 38 as the collision velocity V, based on the relative positions of each object held by the radar device 18. At step 110, the seatbelt control ECU 24 sets a force limiter activation determination threshold Gth2 based on the collision velocity V acquired at step 108. Note that, the force limiter activation determination threshold Gth2 is an example of a second threshold.

Figure 6A:
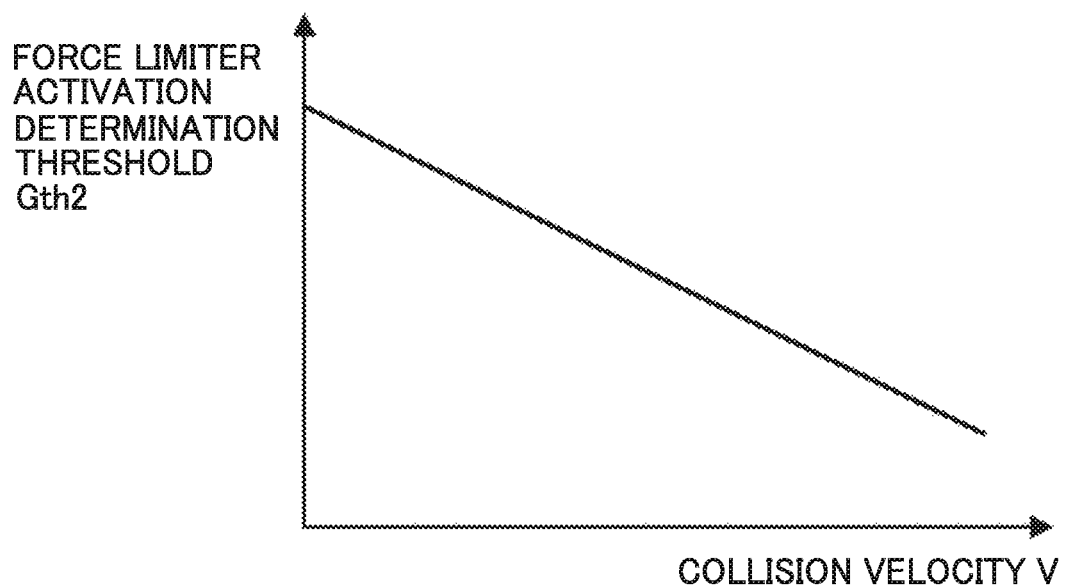
FIG. 6A is a graph illustrating an example of a threshold setting map according to the first exemplary embodiment.

Specifically, as illustrated in FIG. 6A as an example, a relationship between the collision velocity V and the force limiter activation determination threshold Gth2 is defined in a threshold setting map, such that the force limiter activation determination threshold Gth2 decreases as the collision velocity V increases. The force limiter activation determination threshold Gth2 corresponding to the collision velocity V acquired at step 108 is read from the threshold setting map and set. When employing the threshold setting map illustrated in FIG. 6A, in a case in which the collision velocity V exceeds a predetermined value, the force limiter activation determination threshold Gth2 is set to a lower value than the force limiter activation determination threshold Gth2 when the collision velocity V does not exceed this predetermined value.

Figure 6B:
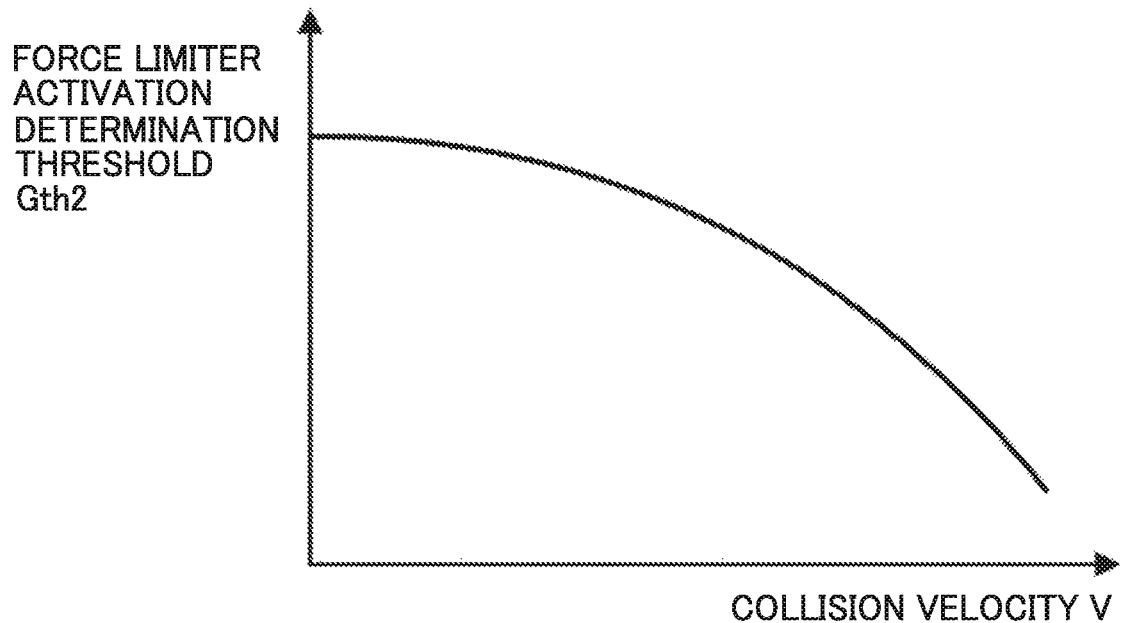
FIG. 6B is a graph illustrating a first alternative example of a threshold setting map.

Note that the threshold setting map defining the relationship between the collision velocity V and the threshold Gth2 such that the force limiter activation determination threshold Gth2 is lowered as the collision velocity V increases is not limited to the example illustrated in FIG. 6A. As illustrated in FIG. 6B, for example, the force limiter activation determination threshold Gth2 may be adjusted in a non-linear manner with respect to change in the collision velocity V, or as illustrated in FIG. 6C, for example, the force limiter activation determination threshold Gth2 may be adjusted in steps with respect to change in the collision velocity V. When these threshold setting maps are employed, in a case in which the collision velocity V exceeds the predetermined value, the force limiter activation determination threshold Gth2 is set to a value equal to or lower than the force limiter activation determination threshold Gth2 when the collision velocity V does not exceed the predetermined value. The relationship between the collision velocity V and the threshold Gth2 may also be defined using another format instead of a map, for example using a function or a table.

At step 112, the seatbelt control ECU 24 starts timing a determination time period A used to determine setting of a starting load for tension reduction of the seatbelt 66 by the force limiter section 60. In the present exemplary embodiment, the starting load for tension reduction of the seatbelt 66 is set to a high load (F1 in FIG. 4) in a state in which the force limiter MGG 76 of the force limiter section 60 is not ignited. The determination time period A is equivalent to the time taken from activation of the pre-tensioner section 58 until determination of the starting load for tension reduction by the force limiter section 60 is completed. The length of the determination time period A is thereby set based on the results of advance testing or the like, such that there is no delay in switching from the high load to the low load in a case in which a collision requires the starting load for tension reduction by the force limiter section 60 to be set to the low load.

Next, at step 114, the seatbelt control ECU 24 acquires the deceleration G detected by the floor sensor 14 from the floor sensor 14. At step 116, the seatbelt control ECU 24 determines whether or not the deceleration G acquired at step 114 exceeds the force limiter activation determination threshold Gth2 previously set at step 110. In a case in which a negative determination is made at step 116, processing proceeds to step 118. At step 118, the seatbelt control ECU 24 determines whether or not the determination time period A has elapsed. In a case in which a negative determination is made at step 118, processing returns to step 114, and the processing of steps 114 to 118 is repeated until the determination of either step 116 or step 118 is affirmative.

Note that in a case in which the deceleration G exceeds the force limiter activation determination threshold Gth2 within the determination time period A, an affirmative determination is made at step 116, and as illustrated at step 120, the seatbelt control processing is ended without outputting an ignition signal to the force limiter drive circuit 36. In such cases, the force limiter MGG 76 is not ignited, thereby maintaining the starting load for tension reduction of the seatbelt 66 by the force limiter section 60 at the initial high load setting (F1 in FIG. 4).

In a case in which the determination time period A elapses without the deceleration G exceeding the force limiter activation determination threshold Gth2, an affirmative determination is made at step 118, and processing proceeds to step 122. At step 122, the seatbelt control ECU 24 outputs a force limiter MGG ignition signal to the force limiter drive circuit 36, and the seatbelt control processing is ended. The force limiter drive circuit 36 accordingly ignites the force limiter MGG 76, and gas generated by the force limiter MGG 76 moves the cam 74, such that the meshing of the cam 74 and the gear 72 is released. The starting load for tension reduction of the seatbelt 66 by the force limiter section 60 is switched from the high load to the low load (F2 in FIG. 4) accompanying this.

Figure 7:
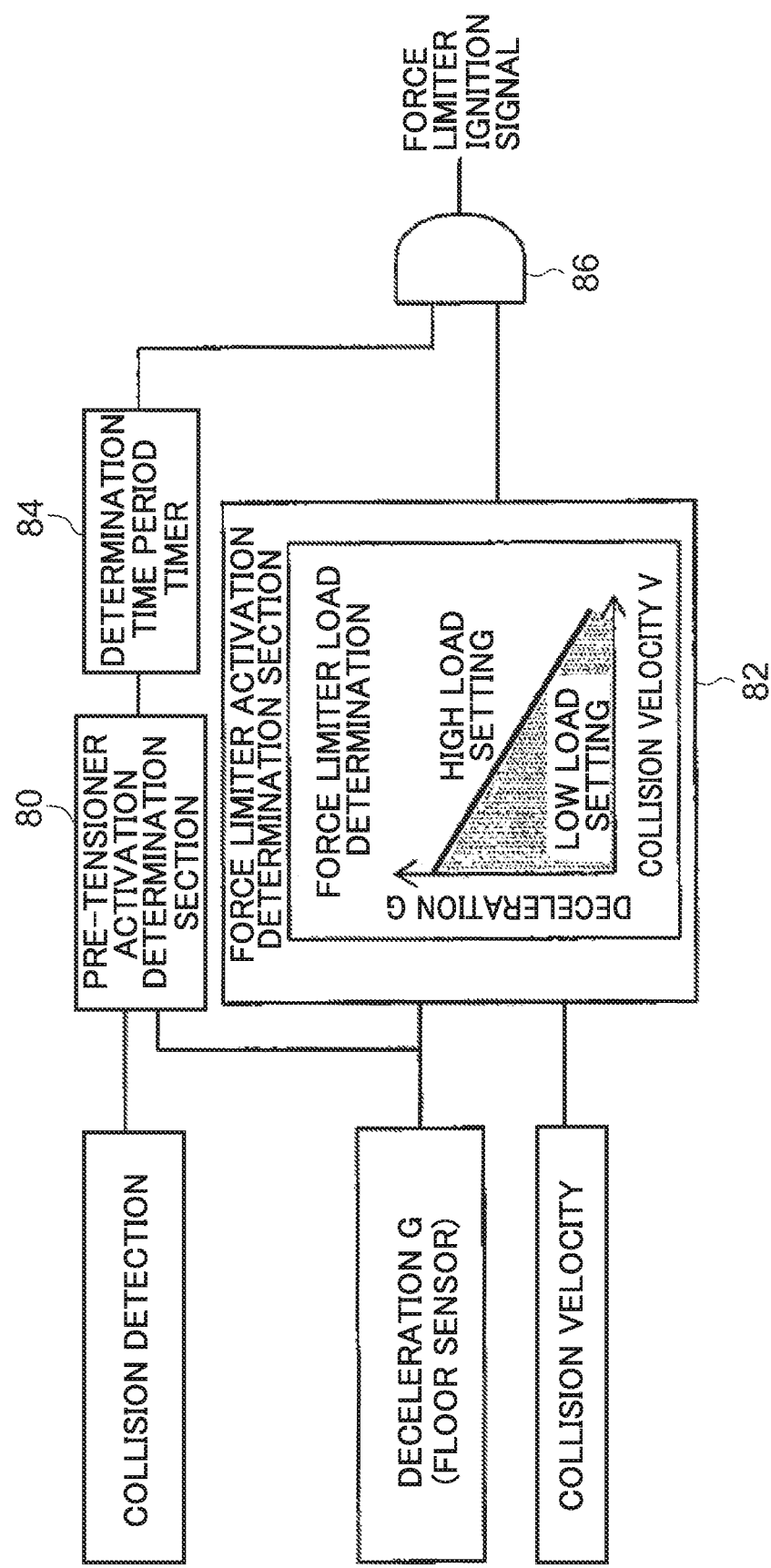
FIG. 7 is a schematic diagram illustrating contents of seatbelt control processing.

The content of the above-described seatbelt control processing is schematically illustrated in FIG. 7. The deceleration G detected by the floor sensor 14 is input to a pre-tensioner activation determination section 80 and to a force limiter activation determination section 82. The pre-tensioner activation determination section 80 determines whether or not to activate the pre-tensioner section 58 based on collision detection results including the deceleration Gs detected by the satellite sensors 16 as well as the deceleration G. In a case in which determination is made to activate the pre-tensioner section 58, a pre-tensioner inflator ignition signal is output to activate the pre-tensioner section 58, and a determination time period timer 84 starts timing the determination time period A. The determination time period timer 84 has a low level output while timing the determination time period A.

In addition to the deceleration the collision velocity V detected by the radar device 18 is also input to the force limiter activation determination section 82. The force limiter activation determination section 82 determines the starting load for tension reduction of the seatbelt 66 by the force limiter section 60 based on a force limiter load determination map, illustrated in FIG. 7. Namely, in the map illustrated in FIG. 7, a two-dimensional space with the collision velocity V and the deceleration G as the respective coordinate axes is divided into a high load setting region and a low load setting region, and the force limiter activation determination section 82 determines in which of these regions the combination of the input deceleration G and the collision velocity V lies. Note that in the map illustrated in FIG. 7, a boundary line between the high load setting region and the low load setting region corresponds to the adjustment of the force limiter activation determination threshold Gth2 with respect to change in the collision velocity V. The force limiter activation determination section 82 outputs at a low level in a case in which the appropriate starting load for tension reduction by the force limiter section 60 has been determined to be the high load, and outputs at a high level in a case in which the appropriate starting load for tension reduction by the force limiter section 60 has been determined to be the low load.

The output of the determination time period timer 84 and the output of the force limiter activation determination section 82 are input to an AND computation section 86. After the determination time period A has elapsed since the determination time period timer 84 started and the output of the determination time period timer 84 has become high level, the AND computation section 86 outputs a high level signal in a case in which the output of the force limiter activation determination section 82 is also high level. The output of the AND computation section 86 corresponds to a force limiter MGG ignition signal. In a case in which the output of the AND computation section 86 becomes high level, the starting load for tension reduction by the force limiter section 60 is switched to the low load. In a case in which the output of the AND computation section 86 remains low level, the starting load for tension reduction by the force limiter section 60 remains at the high load.

Figure 8:
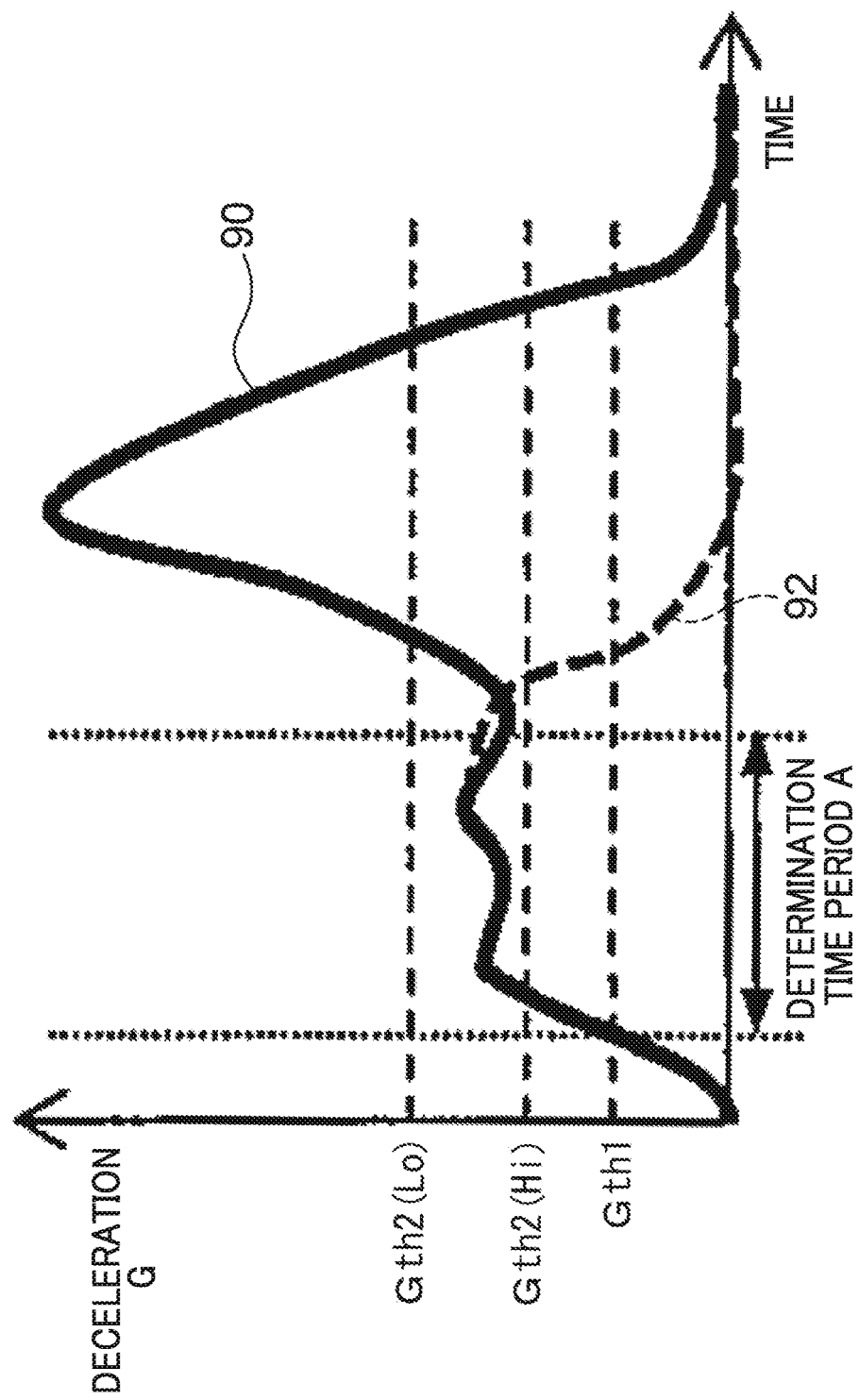
FIG. 8 is a graph illustrating examples of change in deceleration over time and thresholds dependent on collision velocity.

Further explanation follows regarding operation and advantageous effects of the seatbelt control processing according to the present exemplary embodiment, with reference to FIG. 8. FIG. 8 illustrates examples of collisions with low impact intensity during an initial collision stage. The solid line 90 illustrates change in the deceleration G in a high-speed collision between the vehicle 38 and an object with a soft leading end (a first collision). The dashed line 92 illustrates change in the deceleration G in a low-speed collision between the vehicle 38 and a hard object (a second collision).

In the first collision illustrated by the solid line 90, after the determination time period A has elapsed, following on from the soft leading end, a hard portion of the object then strikes the vehicle 38, causing a sharp increase in the deceleration G This collision has a large overall collision energy. It is therefore appropriate to set the starting load for tension reduction by the force limiter section 60 to the high load in the case of the first collision. In contrast thereto, in the second collision illustrated by the dashed line 92, the deceleration G decreases after the determination time period A has elapsed, and the collision has less overall collision energy than the first collision, and so it is appropriate to set the starting load for tension reduction by the force limiter section 60 to the low load. However, the transition of the deceleration G during the determination time period A is at a similar level in both the first collision and the second collision. Therefore, it is not possible to set the starting load for tension reduction by the force limiter section 60 appropriately, by simply comparing the deceleration G against a single threshold during the determination time period A.

In contrast, in the seatbelt control processing according to the present exemplary embodiment, the force limiter activation determination threshold Gth2, against which the deceleration G is compared during the determination time period A, is adjusted so as to lower the force limiter activation determination threshold Gth2 as the collision velocity V increases. Thus, the force limiter activation determination threshold Gth2 is set to a relatively low value in the first collision with a high collision velocity, as indicated by Gth2(Hi) in FIG. 8 as an example. In the first collision, the deceleration G within the determination time period A exceeds the force limiter activation determination threshold Gth2(Hi) that is set to a relatively low value, and so, the starting load for tension reduction by the force limiter section 60 is set to the high load.

In the second collision, in which the collision velocity is low, the force limiter activation determination threshold Gth2 is set to a relatively high value, as indicated by Gth2(Lo) in FIG. 8 as an example. In the second collision, the deceleration G within the determination time period A does not exceed the force limiter activation determination threshold Gth2(Lo) that is set to a relatively high value, and so the starting load for tension reduction by the force limiter section 60 is set to the low load.

Second Exemplary Embodiment

Figure 9:
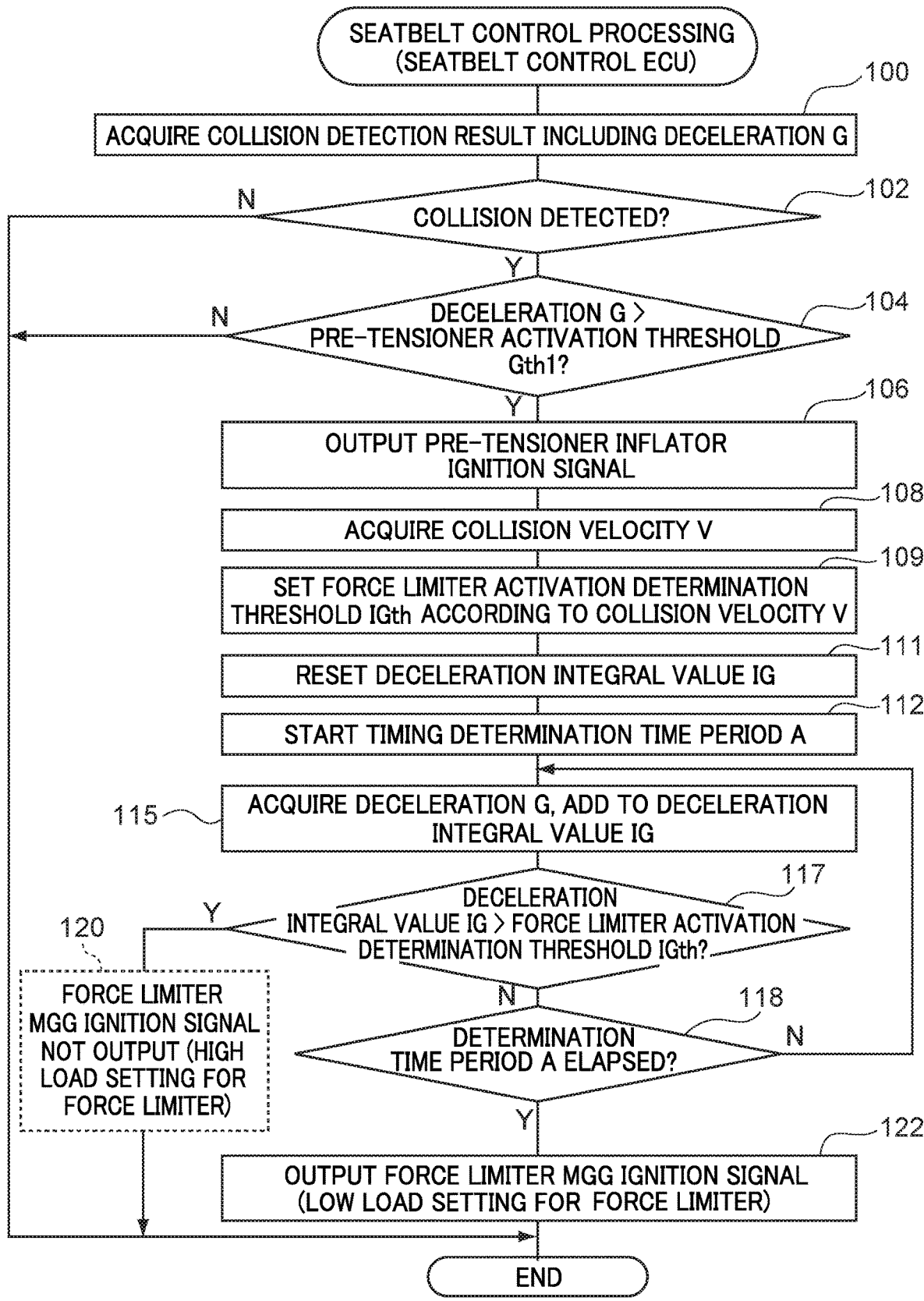
FIG. 9 is a flowchart illustrating seatbelt control processing according to a second exemplary embodiment.

Explanation follows regarding a second exemplary embodiment of the present disclosure. Note that the second exemplary embodiment is configured similarly to the first exemplary embodiment, and so the respective portions are applied with the same reference numerals and explanation of their configuration is omitted. Only operation of the second exemplary embodiment that differs to that of the first exemplary embodiment is explained. As illustrated in FIG. 9, seatbelt control processing according to the second exemplary embodiment differs from that of the first exemplary embodiment in that step 110 has been replaced by steps 109 and 111, step 114 has been replaced by step 115, and step 116 has been replaced by step 117.

Figure 10:
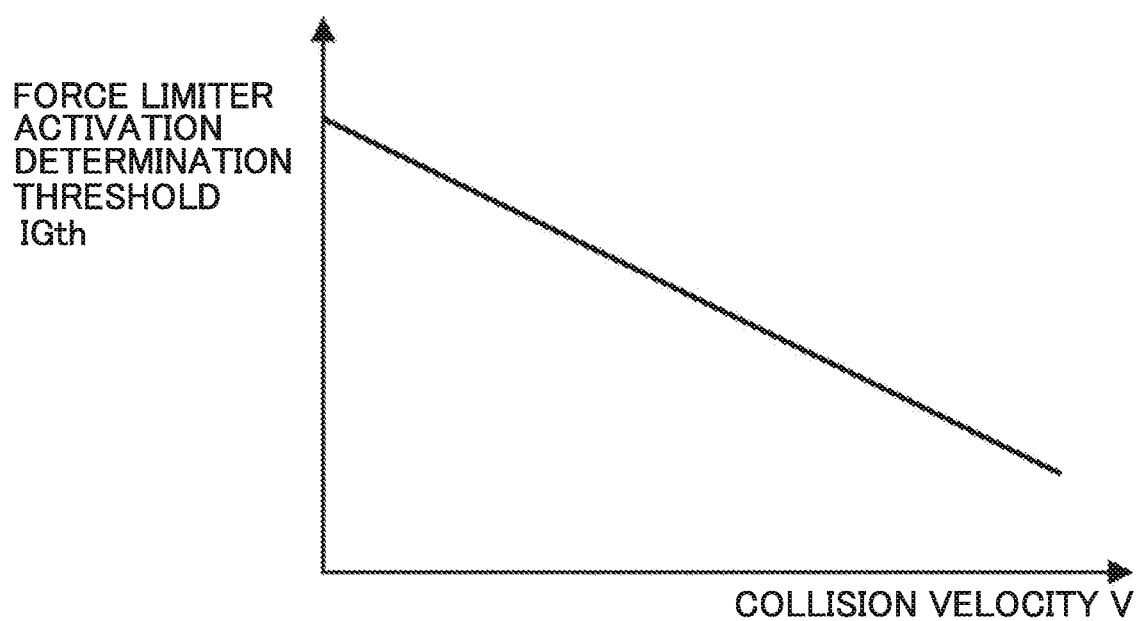
FIG. 10 is a graph illustrating an example of a threshold setting map according to the second exemplary embodiment.

In the second exemplary embodiment, determination regarding activation of the force limiter is made using a deceleration integral value IG instead of the deceleration G Namely, at step 109, the seatbelt control ECU 24 sets a force limiter activation determination threshold IGth, this being a threshold for the deceleration integral value IG, according to the collision velocity V acquired at step 108. As illustrated in FIG. 10, for example, a relationship between the collision velocity V and the force limiter activation determination threshold IGth is set out in a threshold setting map in which the force limiter activation determination threshold IGth becomes lower as the collision velocity V increases. A force limiter activation determination threshold IGth corresponding to the collision velocity V acquired at step 108 is read from the threshold setting map and is set.

When the threshold setting map illustrated in FIG. 10 is employed, in a case in which the collision velocity V exceeds a predetermined value, the force limiter activation determination threshold IGth is set at a lower value than the force limiter activation determination threshold IGth in a case in which the collision velocity V does not exceed this predetermined value. Note that the force limiter activation determination threshold IGth is an example of a second threshold. Next, at step 111, the seatbelt control ECU 24 resets the value of the deceleration integral value IG to 0, for example.

After starting timing of the determination time period A at step 112, at step 115, the seatbelt control ECU 24 acquires the deceleration G from the floor sensor 14 and adds the acquired deceleration G to the deceleration integral value IG The processing of step 115 is repeated until the determination at either step 117 or step 118 is affirmative. Thus, the deceleration integral value IG is a value obtained as a result of integrating the deceleration G from the start of the determination time period A.

Next, at step 117, the seatbelt control ECU 24 determines whether or not the deceleration integral value IG computed at step 115 exceeds the force limiter activation determination threshold IGth previously set at step 109. In a case in which a negative determination is made at step 117, processing proceeds to step 118. The processing of steps 115, 117, and 118 is thereby repeated until the determination at either step 117 or step 118 is affirmative.

In a case in which the deceleration integral value IG exceeds the force limiter activation determination threshold IGth within the determination time period A, an affirmative determination is made at step 117, processing proceeds to step 120 similarly to in the first exemplary embodiment, and the starting load for tension reduction by the force limiter section 60 is maintained at the initial high load setting. In a case in which the determination time period A elapses without the deceleration integral value IG exceeding the force limiter activation determination threshold IGth, an affirmative determination is made at step 118, processing proceeds to step 122 similarly to in the first exemplary embodiment, and the starting load for tension reduction by the force limiter section 60 is switched from the high load to the low load.

In the first exemplary embodiment previously described, the deceleration G is compared against the force limiter activation determination threshold Gth2 to make determination regarding force limiter activation. Thus, for example, there is a possibility that the determination result regarding force limiter activation might be influenced by a momentary fluctuation in the deceleration G caused by the incorporation of noise or the like during the determination time period A. In contrast thereto, in the second exemplary embodiment, the deceleration integral value IG is used instead of the deceleration G to make the determination regarding force limiter activation. Fluctuations in the value of the deceleration integral value IG are thereby suppressed, such that even if the deceleration G momentarily fluctuates during the determination time period A due to the incorporation of noise or the like, any influence on the determination result regarding force limiter activation can be suppressed.

Figure 11:
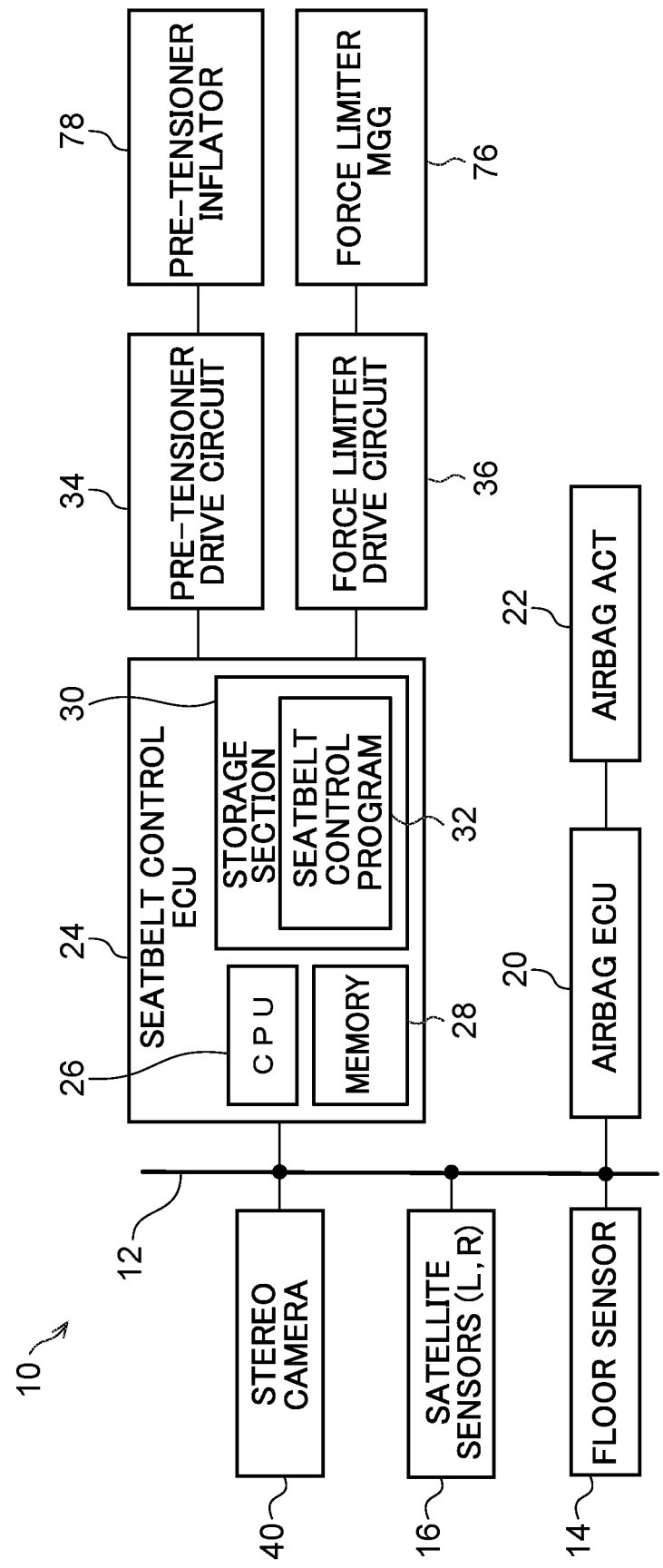
FIG. 11 is a schematic block diagram illustrating a first alternative configuration of an onboard system.

Note that although the radar device 18 is given above as an example of a second detection section that detects collision velocity, there is no limitation thereto. As another example of a second detection section, FIG. 11 illustrates a configuration provided with a stereo camera 40 that captures images of the surroundings of the vehicle 38 using plural cameras. The stereo camera 40 is capable of detecting the distance to an object corresponding to an imaging subject in a captured image, and is also capable of detecting the relative speed of the object based on changes in the distance to the detected object over time, and so the stereo camera 40 may be employed as a second detection section. Alternatively, a combination of the radar device 18 and a camera may be employed as a second detection section. In such cases, a stereo camera or a single lens camera may be employed as the camera. Alternatively, an ultrasound sensor or a laser radar may be employed as a second detection section.

In the above embodiments, the floor sensor 14 detects the deceleration G as an example of a physical quantity relating to the magnitude of a collision; however, the physical quantity is not limited to the deceleration G For example, one out of an integral value of the deceleration a differential value of the deceleration or the size of a colliding object detectable in images captured by a camera may be employed individually, or at least one of these may be employed in combination with the deceleration G.

Figure 12:
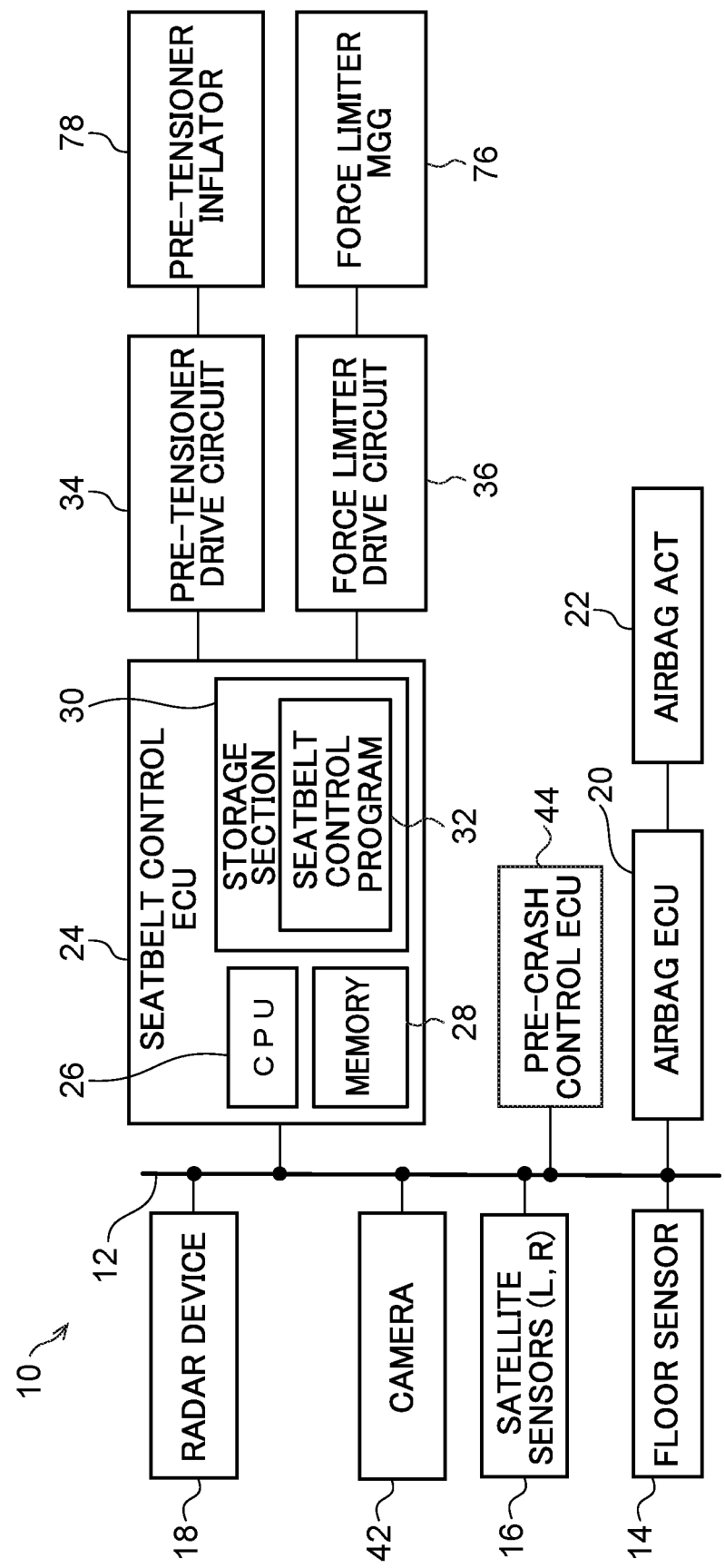
FIG. 12 is a schematic block diagram illustrating a second alternative configuration of an onboard system.
Figure 13:
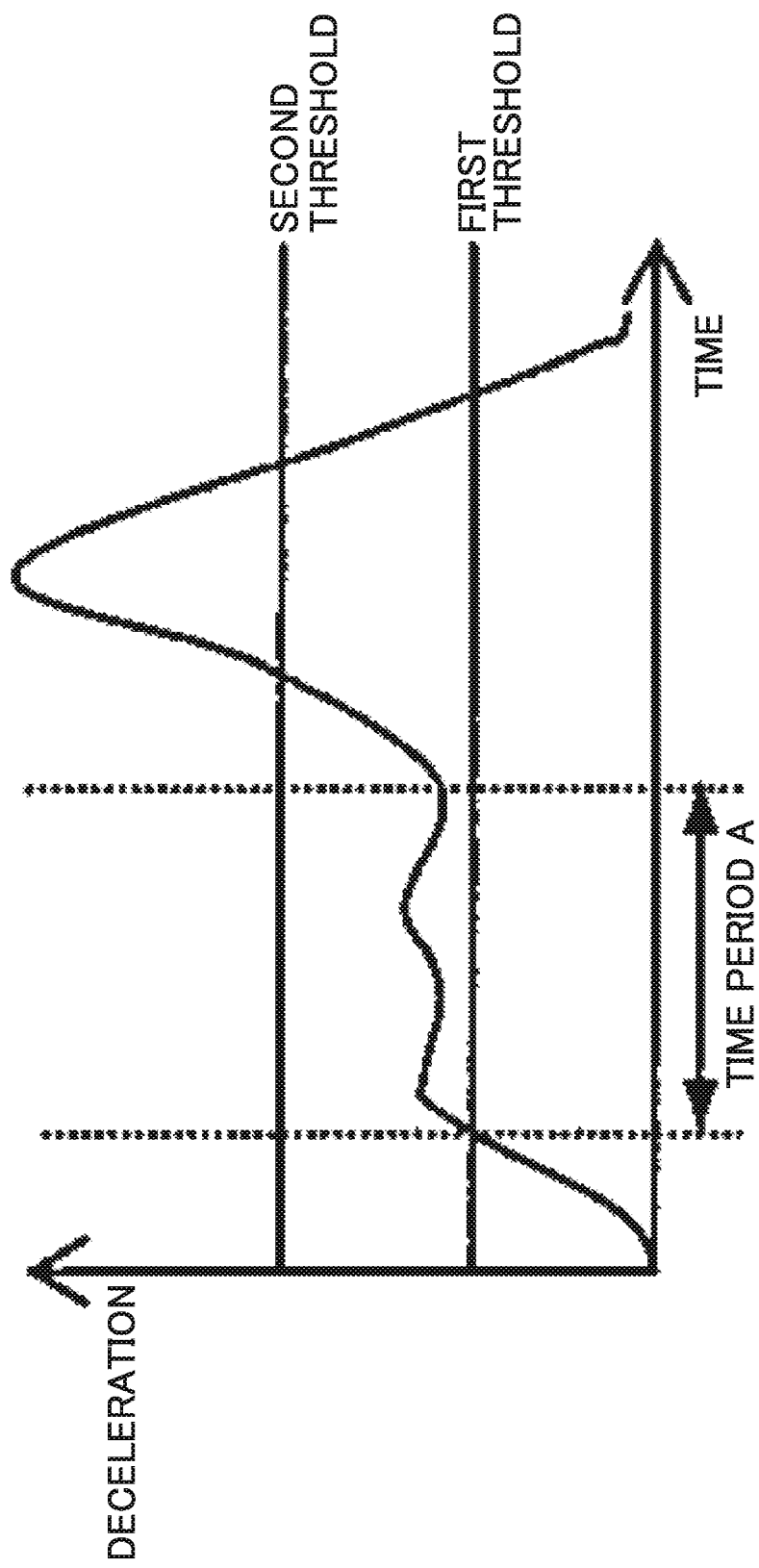
FIG. 13 is a graph to explain an issue arising in related art in the case of a collision in which the impact intensity is low in an initial collision stage.

In the above embodiments, a case in which determination regarding pre-tensioner activation is made after a collision has been detected, and in a case in which the pre-tensioner section 58 is activated, timing of the determination time period A starts and determination is made regarding activation of the force limiter, have been described. However, there is no limitation thereto, and the pre-tensioner section 58 may be configured so as to be activated prior to a collision occurring in a case in which a collision has been predicted by a collision prediction section. An example including a collision prediction section is illustrated in FIG. 12. In FIG. 12, the radar device 18, a camera 42, and a pre-crash control ECU 44 function as the collision prediction section. Note that "pre-crash" is hereafter abbreviated to "PC".

The PC control ECU 44 detects the position of each monitoring target object in an image input from the camera 42 based on information (such as the relative position of each monitoring target object) input from the radar device 18. The PC control ECU 44 also extracts feature amounts of each monitoring target object, and identifies the nature of the monitoring target object (such as a pedestrian or a vehicle) based on the extracted feature amounts. The PC control ECU 44 tracks monitoring target objects present in a predetermined range by repeating the above processing, and computes a probability of a collision with the vehicle for each monitoring target object. If the PC control ECU 44 detects the probability of a collision between a monitoring target object and the vehicle to be a predetermined value or greater (predicts a collision between the vehicle and a monitoring target object), the PC control ECU 44 transmits a collision prediction signal to specific ECUs in the onboard system 10, including the seatbelt control ECU 24. Note that collision prediction is not limited to employing information input from both the radar device 18 and the camera 42, and for example, a collision may be predicted based on information input from one out of the radar device 18 or the camera 42.

In a case in which a collision has been predicted by a collision prediction section in the above manner, the pre-tensioner section 58 may be activated prior to the collision occurring. In such cases, the timing at which to start timing the determination time period A for making the determination regarding activation of the force limiter may be set to a timing at which the collision is detected after the pre-tensioner section 58 has been activated, or may be set to the timing at which the pre-tensioner section 58 is activated.

In the above explanation, the force limiter section 60 is configured such that the starting load for tension reduction of the seatbelt 66 is maintained at the high load in a case in which the force limiter MGG 76 is not ignited, and the starting load for tension reduction is switched to the low load in a case in which the force limiter MGG 76 is ignited. However, a force limiter section is not limited to a configuration in which the starting load for tension reduction is switched between two levels as described above. A configuration may be applied in which the starting load for tension reduction can be varied between three or more levels. In such cases, plural second thresholds with different values to each other are employed in order to determine which out of the three or more levels of the starting load for tension reduction to switch to. Applying the present disclosure in such cases enables each second threshold to be adjusted and set according to the collision velocity.

In the seatbelt retractor device 50 described above, normally, the spring mechanism 79 retracts the seatbelt 66, whereas in a collision, the pre-tensioner section 58 retracts slack in the seatbelt 66, and the force limiter section 60 regulates the tension of the seatbelt 66. However, development of a motor with higher torque would enable the configuration of a seatbelt retractor device to be modified such that retract of a seatbelt and regulation of tension were performed by the motor. The present disclosure could be applied to a seatbelt retractor device with such a configuration, albeit with at least one out of the function of the pre-tensioner section or the function of the force limiter section being realized by drive force of the motor.

What is claimed is:

1. A seatbelt control device comprising:
   a pre-tensioner configured to retract a seatbelt to increase tension of the seatbelt;
   a force limiter configured to change a magnitude of a load at which to start reducing tension of the seatbelt retracted by the pre-tensioner;
   a second detection sensor configured to detect a collision velocity; and
   a controller configured to activate the pre-tensioner when a physical quantity relating to a magnitude of a collision detected by a first detection sensor for detecting the physical quantity exceeds a first threshold, the controller controlling the load of the force limiter when, within a predetermined period after activation of the pre-tensioner, the physical quantity detected by the first detection sensor has exceeded a second threshold set according to the collision velocity, so as to be a greater load than the load of the force limiter when the physical quantity has not exceeded the second threshold within the predetermined period.

2. The seatbelt control device of claim 1, wherein the controller sets the second threshold applied in a case in which the collision velocity has exceeded a predetermined value, to a value no greater than the second threshold applied in a case in which the collision velocity has not exceeded the predetermined value.

3. The seatbelt control device of claim 1, wherein the second detection sensor is at least one of a radar or a camera.

4. The seatbelt control device of claim 1, wherein:
   the first detection sensor detects deceleration as the physical quantity; and
   the controller, sets as the second threshold, a threshold for an integral value of the deceleration detected by the first detection sensor according to the collision velocity, and determines whether or not the integral value of the deceleration has exceeded the set second threshold within a predetermined period after the pre-tensioner has been activated.

5. A seatbelt control device comprising;
   a pre-tensioner configured to retract a seatbelt to increase tension of the seatbelt;
   a force limiter configured to change a magnitude of a load at which to start reducing tension of the seatbelt retracted by the pre-tensioner:
   a collision prediction processor configured to predict a collision:
   a first detection sensor configured to detect a physical quantity relating to a magnitude of a collision:
   a second detection sensor configured to detect a collision velocity: and
   a controller configured to activate the pre-tensioner when a collision has been predicted by the collision prediction processor, the controller controlling the load of the force limiter when, within a predetermined period after activation of the pre-tensioner or after detection of the collision, the physical quantity detected by the first detection sensor has exceeded a second threshold set according to the collision velocity, so as to be a greater load than the load of the force limiter when the physical quantity has not exceeded the second threshold within the predetermined period.

6. The seatbelt control device of claim 5, wherein the controller sets the second threshold applied in a case in which the collision velocity has exceeded a predetermined value, to a value no greater than the second threshold applied in a case in which the collision velocity has not exceeded the predetermined value.

7. The seatbelt control device of claim 5, wherein the second detection sensor is at least one of a radar or a camera.

8. The seatbelt control device of claim 5, wherein:
   the first detection sensor detects deceleration as the physical quantity; and
   the controller, sets as the second threshold, a threshold for an integral value of the deceleration detected by the first detection sensor according to the collision velocity, and determines whether or not the integral value of the deceleration has exceeded the set second threshold within a predetermined period after the pre-tensioner has been activated.

* * * * *